United States Patent [19]

Draper et al.

[11] Patent Number: 4,602,438
[45] Date of Patent: Jul. 29, 1986

[54] METHOD AND APPARATUS FOR FLUIDIZED STEAM DRYING OF LOW RANK COALS WITH WET SCRUBBING

[75] Inventors: Robert Draper, Churchill Boro; Robert W. Wolfe, Wilkinsburg, both of Pa.

[73] Assignee: Westinghouse Electric Corp., Pittsburgh, Pa.

[21] Appl. No.: 727,949

[22] Filed: Apr. 26, 1985

[51] Int. Cl.[4] .............................................. F26B 3/04
[52] U.S. Cl. ......................................... 34/10; 34/32; 34/77; 34/57 A; 34/172; 34/177
[58] Field of Search ............... 34/169, 57 A, 172, 177, 34/10, 26, 35, 86, 68, 27, 32, 77, 75, 79

[56] References Cited

U.S. PATENT DOCUMENTS

| | | | |
|---|---|---|---|
| 1,907,569 | 5/1933 | Parr et al. | 34/27 |
| 2,666,269 | 1/1954 | Parry . | |
| 4,052,168 | 10/1977 | Koppelmann . | |
| 4,284,476 | 8/1981 | Wagener et al. | 34/86 |
| 4,339,306 | 7/1982 | Janusch . | |
| 4,379,692 | 4/1983 | Weber et al. . | |
| 4,400,176 | 8/1983 | Kutta . | |
| 4,523,388 | 6/1985 | Cuel | 34/35 |

OTHER PUBLICATIONS

"A Study on Upgrading of Low Grade Coals by Heat Treatment" K. Toada et al; Technical Review, Oct. 1982, pp. 259–266.

Steam Drying of Lignite; Stanmore et al, NTIS, US Dept. of Commerce, Springfield, VA 22161 (1982).

"Enriching Western Coals by Thermal Drying and Oil Treatment", Wegert et al., Coal Age, May, 1976, pp. 96–100.

Technical and Economic Study of Drying Lignite & Subbituminous Coal by the Fleissner Process; Harrington et al., US Govt. Printing Off; 1942.

Primary Examiner—Larry I. Schwartz
Attorney, Agent, or Firm—Daniel C. Abeles

[57] ABSTRACT

A method and apparatus for drying low-rank coals, such as lignite, where the coal is passed through a sealed vessel in a plurality of heated fluidized beds, with fluidization effected by superheated steam flowing countercurrent to the coal flow. A composite steam is exhausted from the sealed vessel and passed to a vessel where water is sprayed therein to cool the same and remove occluded solids. A first portion of the steam is then reheated and returned to the sealed vessel as fluidizing steam, while a second portion of the steam is heated and passed through heat exchange tubes in the sealed vessel to heat the fluidizing coal, with the second portion, after passage through the heat exchange tubes discharged from the system.

13 Claims, 1 Drawing Figure

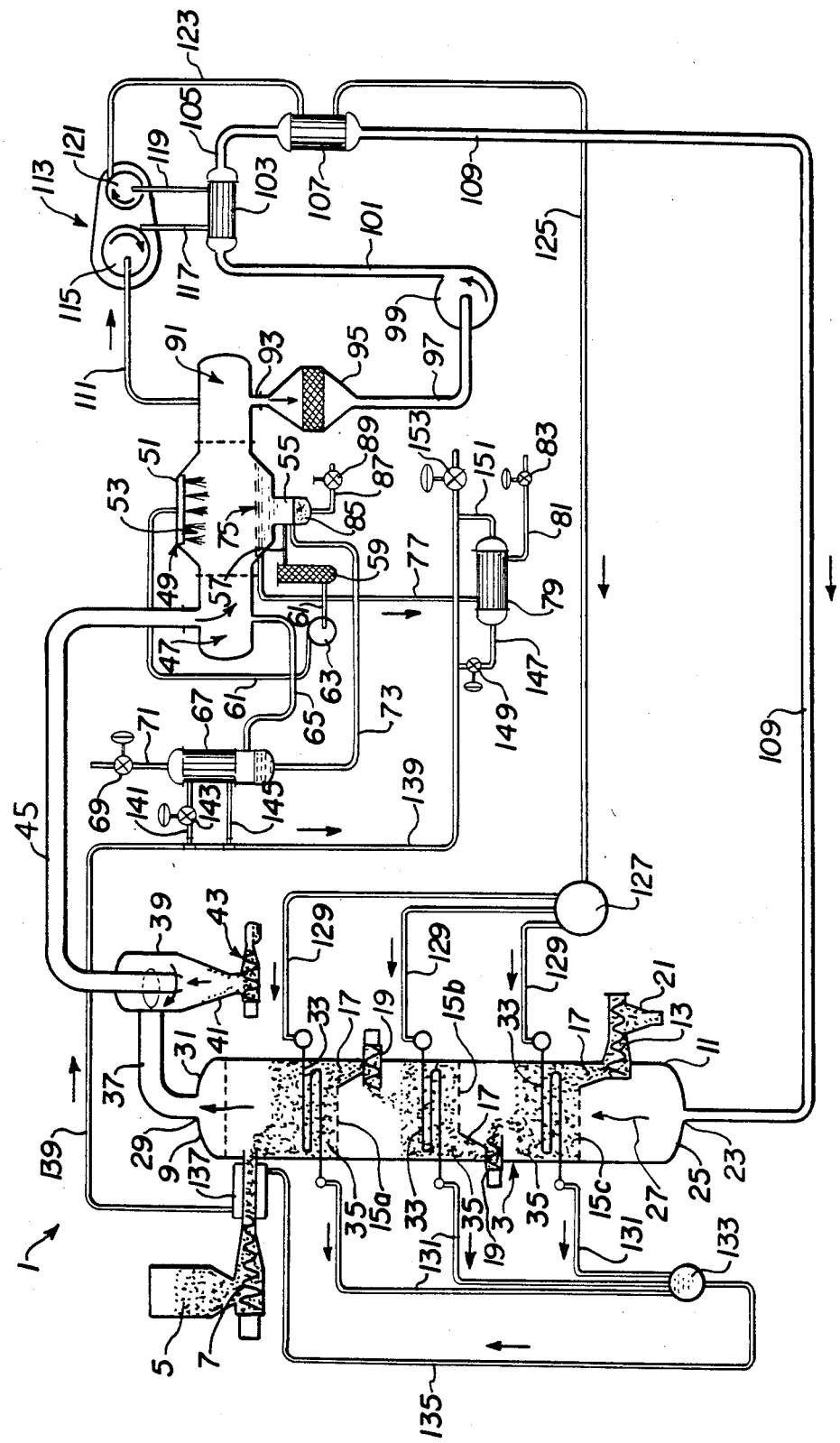

METHOD AND APPARATUS FOR FLUIDIZED STEAM DRYING OF LOW RANK COALS WITH WET SCRUBBING

CROSS-REFERENCE TO RELATED APPLICATIONS

An apparatus and method for drying of low-rank coals, using a fluidized bed steam drying system and partial condensation of composite steam from a drying vessel in a sealed condenser, are described in a related application of the present inventors, Ser. No. 727,950, entitled "Method and Apparatus for Fluidized Steam Drying of Low-Rank Coals", filed on even date herewith assigned to the assignee of the present invention.

An apparatus and method for steam drying of low-rank coals using a rotating cylindrical drying vessel, are described in a related application of the present inventors, Ser. No. 727,948, entitled "Method and Apparatus for Steam Drying of Low-Rank Coals Using a Rotary Cylindrical Vessel", filed on even date herewith also assigned to the assignee of the present invention.

BACKGROUND OF THE INVENTION

Reserves of lignite and subbituminous coals in the United States are estimated to be in excess of 1 trillion tons. Demonstrated reserves are presently placed at 250 billion tons. This vast energy reserve is for the most part located in sparcely populated areas of the western United States and in the western gulf states. A large fraction of the reserves are near to the surface and can be strip mined at low cost.

In 1960, the production of lignite and subbituminous coals was insignificant on the national scale. Presently, these low-rank coals account for approximately 25% of the 900 million tons per year United States production rate. Lignite and subbituminous coal production has accounted for virtually all of the growth in coal production which has taken place in the United States in the last decade.

Low-rank coals have relatively low sulphur content. Low sulphur content generally results in easier compliance with regulations pertaining to emissions of combustion products to the atmosphere. As mined, the sulphur content of lignite ranges from 0.3% by weight to 1% and is most commonly about 0.7%. This compares favorably with bituminous coals which range in sulphur content from 1.2% by weight to 3.5%.

The one significant impediment to the use of lignite and subbituminous coal is their high water content. For lignite mined in the United States the water content ranges from 25% by weight to 45% by weight. High water content supresses the caloric value of the coal, creates handling problems, and increases transportation cost. For these reasons, there is great interest in developing economical methods of drying low-rank coals.

Lignite and subbituminous coals hold water in three ways. First, these low-rank coals hold surface water. The amount of surface water which might be present following a wet cleaning process increases with decreasing particle size. Coals crushed to about ¼ in. particle size hold between 10 and 15% by weight surface water. When the coal is crushed to 28 mesh size, surface water can account for as much as 45% of the bed weight. Removal of surface water is accomplished quite readily and the process is commonly called dewatering.

Low-rank coals (especially lignite) hold water in interstitial cavities between the carbonaceous fibers. Interstitially held water can account for as much as 45% of the weight of a bed of lignite from which surface water has already been removed. While lignite and subbituminous coals hold comparable amounts of post-wash surface water to coals of similar particle size but high caloric rank, the presence of a large amount of interstitial water is unique to the lower-rank coals. The process used to remove interstitially held water is termed drying. Because interstitial water is held in the small pores between the coal fibers, it is not readily removed by mechanical means. Present thermal drying methods are overly consumptive of energy; consequently, low-rank coals are usually transported and burned without the beneficial effect of drying.

Another way in which water is held in low-ranked coals is in very small closed pores within the carbonaceous fibers. Because the pores are unconnected, removal of this water is extremely difficult and thermal methods provide the only means. For this reason, this water is referred to as bound water. Bound water constitutes only a few percent of the mass of coals of all calorific ranks and as such, does not represent an attractive target for removal, moreover, no economical means exist for its removal.

As mentioned above, the removal of surface water is termed dewatering. For the most part, dewatering is accomplished by mechanical means. Such means include shaker screens which continually disrupt the coal/water matrix and cause the water to drain from the bed under gravity. Centrifuges are also used to dewater low-rank coals. Another means of removing surface water is vacuum filtration. In vacuum filtration, air is sucked through the bed of coal and draws the water with it. Vacuum filtration can be used in conjunction with vibratory and centrifugal methods. Dewatering can be assisted by the addition of surfactants which lower the surface tension of the water and the application of heat, which, by virtue of an increase in temperature, reduces both surface tension and viscosity. The application of an ultrasonic sound field has been shown to assist the dewatering of fine coal particles.

Thermal dewatering methods involve blowing hot air or the products of combustion through the coal bed. Some heat recovery is possible. However, psychrometric restraints make the recovery of the latent heat of vaporization impractical when the steam is mixed with a large quantity of noncondensible gases. For this reason, present thermal dewatering methodologies are relatively uneconomical and are not widely practiced.

Water held interstitially within the particles of low-rank coals makes no contribution to the calorific value of the coal. Rather, from a caloric viewpoint, it is parasitic in that it absorbs heat to achieve evaporation. Moist coal can freeze in stockpiles during cold weather and transportation costs are inflated because unwanted water is shipped with the coal. For these reasons, and because low-rank coals represent one of the nations most important fossil energy resources, there is growing interest in developing means of removing interstitially held water. This process, as mentioned above, is termed drying, as opposed to dewatering which is correctly applied to the removal of surface water. Presently, very little lignite and subbituminous coal is dried in the United States.

Not surprisingly, the techniques which have been applied to the removal of small amounts of water (a few percent by weight) from high-rank coals have been examined for their applicability to drying lignite and subbituminous coals. These methods are based upon the concept of bringing the coal particles into contact with a hot gas stream such as air or the products of combustion. Tumbling the coal particles in a rotating drum through which the hot gas stream is passed and fluidizing a bed of coal particles with the hot gas stream are two methods which have been used to dry high-rank coals. Two factors combine to render these methods unsatisfactory for the drying of low-rank coals. First, the weight of water which must be evaporated per pound of dried product is much greater for low-rank coals than for high-rank coals. Relative to high-rank coals, the overall economics of low-rank coal utilization is much more sensitive to the economics of the drying process. Moreover, the traditional form of drier, described above, does not operate efficiently from a thermal viewpoint. This is because the low partial pressure of the steam in the steam/hot gas exhaust makes it difficult to recuperate the latent heat of vaporization. Consequently, the energy consumed in drying a low-rank coal exceeds 10% of the caloric value of the dried product.

A second reason why existing thermal driers are not suitable for drying lignite and subbituminous coal is that these coals are more susceptible to spontaneous ignition as they approach a fully dried condition than are higher-rank coals. Reactivity in air increases with decreasing rank because low-rank coals contain a higher fraction of volatile matter. Fine particles of dry lignite present a serious explosion hazard in a high temperature environment containing free oxygen.

Another new drier type which is under investigation is the so-called hot water drier. In this drier, lignite is mixed with water to form a slurry which is then heated to about 650° F. at a pressure sufficient to maintain liquid conditions ($P \cong 2200$ psi). At high temperature, carboxylic groups within the lignite decompose to form carbon dioxide. The $CO_2$ gas expels much of the water from the interstitial cavities. Hydrophilic carboxyl groups on the surface of the coal granule are replaced by hydrophobic hydrocarbon groups. This effect along with capillary factors inhibits repenetration of the interstitial cavities by the water as the system is cooled down and depressurized. Test data indicates that this system is capable of reducing the water content of lignite to about 10% by weight. The high operating values of temperature and pressure present significant difficulties in the design of commercial sized equipment.

Although mechanical methods dominate dewatering technology, they yield to thermal methods when it is necessary to do drying which, by our definition, implies removing interstitially held water. Some work on mechanical drying methods has been performed, however. In this regard, it is estimated that a centrifuge operating with a centrifugal acceleration of $5 \times 10^4$ ft/sec$^2$ (twice the highest value used in dewatering equipment) will reduce the water content of a 1 ft. deep bed of lignite from 45% to 10% in 1 minute. Unfortunately, this is associated with a hoop stress close to 17000 psi. This stress is close to the allowable operating level for alloy steels.

There is interest in the application of ultrasonic compression waves to assist other mechanical drying means such as centrifuging, vacuum filtration, and pressure displacement. However, this technology is in an embryonic stage and any forecast as to its ultimate role in drying low-rank coal is purely speculative.

It is an object of the present invention to provide an apparatus and method for drying of low-rank coals by removal of interstitial water therefrom in an efficient and safe manner.

SUMMARY OF THE INVENTION

An apparatus and method for drying low-rank coals containing interstitial water by the use of superheated steam to fluidize the coal in a plurality of beds in a sealed vessel.

A sealed vessel, preferably vertically disposed, has spaced perforated plates therein upon which beds of fluidized, low-rank coal are formed by superheated steam injected into the vessel and flowing countercurrently therethrough relative to the low-rank coal. Heat exchange tubes are provided in the area of each of the fluidized beds and the low-rank coal is heated to evaporate water, with the evaporated water forming a composite steam with the injected steam, which composite steam is discharged from one end of a sealed vessel while low-rank coal having water removed therefrom is discharged from the other end of the sealed vessel. Means are provided, such as a horizontally extending spray vessel, for spraying water into the composite steam flow, after exhaustion from the sealed vessel, to remove solids and volatiles therefrom, with the steam flow from the spray vessel divided into a first portion for reheating and recycle to the sealed vessel and a second portion for vapor compression heating and passage to heat exchange tubes in the sealed vessel to heat the low-rank coal therein. The second portion of steam, after heating of the low-rank coal through the heat exchange tubes is collected and discharged, with the same preferably used to preheat the low-rank coals prior to such discharge.

The present method provides for the drying of low-rank coals by removing interstitial water therefrom with low-rank coal fed to a sealed vessel, and superheated steam injected into the sealed vessel for countercurrent flow therethrough. The superheated steam fluidizes the low-rank coal in a series of fluidized beds where the coal is heated, by heat exchange tubes in the fluidized beds, in order to vaporize water therefrom to form a composite steam flow. The composite steam flow is removed from the sealed vessel and low-rank coal, with water removed therefrom, also removed from the sealed vessel. The composite steam has water sprayed therein to remove solids and volatiles and the steam flow is divided into first and second portions. The first portion is reheated and returned to the sealed vessel for reuse as a fluidizing media. The second portion, which is in an amount substantially equal to the water removed from the low-rank coal in the sealed vessel, is compressed to heat the same, and heat the first portion, and is then used to heat the low-rank coal in the sealed vessel by heat exchange therewith through heat exchange tubes in the vessel. The second portion is then discharged from the system, preferably after use as a preheating source to preheat the low-rank coal fed to the sealed vessel.

DESCRIPTION OF THE DRAWING

The drawing is a schematic illustration of an apparatus of the present invention for use in the method of the present invention for drying low-rank coal.

DETAILED DESCRIPTION

The present invention provides an apparatus and continuous method for drying low-rank coals. "Low-rank coals" as used herein, is used to describe solid carbonaceous fuels having a water content in excess of about 25 percent by weight of the solid carbonaceous fuel. Such low-rank coals include lignite, peat, and subbituminous coals which contain water as surface water, interstitial water, and bound water. For the purpose of brevity, the following description will refer to the use of lignite, although drying of other low-rank coals is includable in the invention. The drying of the low-rank coals is effected to give a residual water content of less than about 5 percent by weight based on the weight of the low-rank coal.

Referring now to FIG. 1, an embodiment of the present apparatus 1 has a sealed vessel 3, in the form of a vertically disposed cylindrical vessel. Crushed lignite in a particle size preferably between 0.3 to 0.6 cm in diameter, with surface water removed, from a hopper 5 is fed, as by a compacting screw 7, into one end 9 of the vessel 3. As the lignite is passed through the vessel 3, the same is dried as hereinafter described, and is removed from the other end 11, such as by a compacting screw 13. Between the one end 9 and other end 11 of the sealed vessel, there are a plurality of spaced perforated platforms 15, the platforms extending partially across the interior diameter of the sealed vessel 3, as illustrated, with adjacent spaced platforms extending from opposite sides of the inner wall of the vessel 3. As illustrated, the perforated platform 15a closest to the screw 7 extends from the same side of the vessel as contains the compacting screw, the adjacent platform 15b, below platform 15a extends from the opposite side of the vessel, while the sub-adjacent platform 15c extends from the same side of the vessel as platform 15a. This placement of the platforms 15a, 15b and 15c, provides a tortous flow of lignite from the one end 9 to the other end 11 of vessel 3. Internal discharge hoppers 17 are provided adjacent the perforated platforms 15a, 15b and 15c with a screw mechanism 19 associated therewith to transport lignite from one platform to a subjacent platform, and finally to the removal compacting screw 13, with the dry lignite discharged at 21 for use as a fuel.

A steam injector 23, at the bottom 25 of sealed vessel 3 is provided to inject pressurized steam 27 into the vessel for flow upwardly therethrough and exhaust the same at an exhaust 29 in the top 31 of the vessel 3. Heat exchange tubes 33 are positioned in the vessel 3, adjacently above the perforated plates 15a, 15b and 15c, the heat exchange tubes adapted for flow of a fluid therethrough. Lignite charged to the closed vessel forms beds 35 of lignite material on each of the perforated plates 15a, 15b and 15c which cover the heat exchange tubes 33 as the lignite passes through the vessel 3. Injection of pressurized steam 27 through the injector 23 and passage through the vessel 3 countercurrent to the flow of lignite therein, causes fluidization of the beds 35 of lignite so as to effect good contact between the lignite in beds 35 and the heat exchange tubes 33. The motion of the lignite granules brings the lignite granules and surrounding steam into excellent contact with the heat exchange tubes 33. While the drawing illustrates the use of three perforated plates 15, and thus three fluidized beds 35 of lignite, the actual number of perforated plates, and thus beds, could vary, although a plurality of such beds would be needed. The discharge of lignite from one bed to a subadjacent bed is regulated by the speed of the screw mechanism 21.

An important feature of this multistage fluidized bed drier is that the steam flow which is available for fluidization increases as the steam ascends through the sealed vessel and encounters progressively wetter granular material. For example, the driest granular lignite, which occupies the lowest bed 35, on perforated plate 15c, is fluidized by the recirculated steam flow 27, while the wetter granules in the higher bed 35, on perforated plate 15b, are fluidized by the sum of the recirculated steam flow and the steam evaporated off the lowest bed. Similarly, the wettest lignite in the first stage bed 35, on perforated plate 15a, is fluidized by the sum of the recirculated steam flow and the water which is evaporated off all lower lignite beds. From a fluidization viewpoint, this is a very favorable arrangement.

After a period of residence in the last drying bed 35, on perforated plate 15c, the lignite granules are transported out of the drying autoclave by the compacting screw 13. This screw turns at a rate sufficient to maintain the setpoint level in the last bed.

After leaving the sealed vessel 3, through exhaust 29, the composite steam passes through line 37 into a solids separator, such as cyclone separator 39. The term "composite steam" as used herein, designates the steam exhausted from the sealed vessel, which is comprised of the steam injected into the sealed vessel for fluidizing purposes and heating of the lignite, as well as the steam resulting from evaporation of water from the lignite. The composite steam is mostly steam with a small amount of air and other gases which are vaporized from the lignite. Some lignite fines are present in the composite steam, although the fact that the wettest lignite bed occupies the uppermost platform 15a of the sealed vessel 3 limits the carryover of fines. Lignite fines collect in the cyclone separator 39 and fall to a discharge hopper 41. From the hopper 41, the lignite fines are discharged from the system by means of a compacting screw 43.

The composite steam flow is exhausted from the solids separator 39 through line 45 and passed to the inlet head 47 of a closed scrubber 49. The scrubber 49 is comprised of a horizontally extending vessel 51 having means such as a plurality of sprayers 53 for injecting water into the composite steam to clean the same. Water from the sprayers 53, collects in a reservoir 55 at the bottom of the horizontally extending vessel 51. Water from the reservoir 55 is recycled by means of line 57, through a filter 59 and then through line 61, containing a pump 63, to the sprayers 53. The purpose of the scrubber is to extract suspended solids and volatiles which have a saturation temperature above that of the steam. Steam condensation is minimal by virtue of the near saturated condition of the spray water.

Extraction of non-condensible gases with a saturation temperature below that of the steam from the composite steam flow is effected by passing the gases through line 65 from the bottom of the scrubber inlet head to a small steam condenser 67. Noncondensibles and some steam are discharged from the system by means of a vent valve 69 in an exhaust line 71 from the condenser 67. Condensate formed in the condenser 67 is returned by means of line 73 back to the reservoir 55 of the scrubber 49.

In order to prevent accumulation of excess water in the scrubber 49, water is drawn from the surface 75 of the pool of water in the reservoir 55, through line 77, the withdrawn water cooled in a heat exchanger 79, prior to discharge from the system through line 81 containing discharge valve 83. In addition to water, this stream contains any light distillates which might be present. Solids, and any heavy distillates which may be present in the reservoir 55 fall to the bottom of the reservoir and form a sludge 85. This material is discharged from the scrubber 49 by means of line 87 containing valve 89.

In the outlet head 91 of the scrubber 49, the steam flow divides. A recirculating portion of the steam flow is passed through line 93 to a filter 95. From the filter 95, the recirculating portion of steam passes through line 97 to a blower 99 and then through line 101 to a first heat exchange unit 103 in which it is superheated. The recirculating portion of steam then flows through line 105 to a second heat exchange unit 107 where it is further superheated. This superheated recirculating portion of the steam is then returned by means of line 109 to the steam injector 23 of the sealed vessel 3.

The remaining portion of the steam flow from the outlet header 91 of the scrubber 49 is used as the heat exchange medium in the heat exchange coils 33 of the sealed vessel 3. The mass of steam exhausted through line 111 of the scrubber 49 is substantially equal to the mass of water removed from the low-rank coal in the pressure vessel 3, less the mass of steam condensed in the steam condenser 67 of the non-condensible removal system. Steam from line 111 passes to a multi-stage compressor 113. Superheated steam from the first stage of compression 115 passes through line 117 to the first heat exchange unit 103 to transfer heat to the recirculating steam portion. Another beneficial effect of this interstage compression is to make the overall compression step more nearly isentropic and thus more efficient. The steam is returned from the first heat exchange unit 103, through line 119, to the second stage of compression 121 of the compressor 113. Following compression, this portion of the steam flow passes through line 123 to the second heat exchange unit 107 to heat again the recirculating portion of the steam. After leaving the second heat exchange unit 107, the compressed, superheated steam flows through line 125 to a distribution header 127 and through branch lines 129 to the heat exchange coils 33 in the sealed vessel 3.

In the heat exchange tubes 33, the superheated steam is condensed through heat exchange with the lignite in fluidized beds 35. Condensate from the heat exchange tubes 33 flows through lines 131 to a collection header 133. The hot condensate is carried by line 135 to a heating jacket 137 where the same preheats lignite being charged to the sealed vessel 3. Condensate exhausted from the jacket heater 137 flows through line 139. A portion thereof is fed through line 141, containing valve 143, to the condenser 67 to provide concentration of non-condensables and is returned by line 145 to line 139. A further portion of condensate from line 139 is passed through line 147, containing valve 149, to the heat exchanger 79 to cool excess scrubber water discharge, and is returned to line 139 by means of line 151. The condensate is then discharged from line 139 through a discharge valve 153.

In the present method, an open cycle steam compression system is used to recover heat and heat the recycle steam used in the heat transfer tubes of the sealed vessel for drying of low-rank coal.

Because air is excluded from the sealed vessel to the maximum extent possible, the sealed vessel is operated at a positive pressure in the region of 1-3 atmospheres, preferably 1-2 atmospheres. Such a pressure of 1-2 atmospheres corresponds to a water saturation temperature of about 121°-135° C., which would be the temperature of the steam in the sealed vessel and the temperature of the composite steam discharged from the sealed vessel. The temperature of the steam entering the sealed vessel 3 through line 109 should be about 160°-170° C. This elevation of the incomming steam temperature above the saturated temperature precludes the possibility that the steam might partially condense in the lower regions of the sealed vessel 3. Normally, some heating of the lignite is provided by direct contact with the superheated fluidizing steam 27. In the heat exchange tubes 33, the second portion of steam should be at a temperature of at least about 50° C. above the steam injected into the sealed vessel to effect the necessary heat exchange. The saturation temperature of the second portion of steam in the heat exchange tubes 33 should thus be at a temperature of at least about 210°-220° C.

The present invention dramatically reduces energy consumption in drying of low-rank coals. Also, there are no combustion product emissions using the present method, and relatively clean water is produced as a by-product of the method, which is usable in areas where lignite is mined and water scarce. The present invention also eliminates the danger of spontaneous ignition within the sealed vessel since an all steam drying environment is present. A low cost system is provided for the drying of low-rank coals.

What is claimed is:

1. An apparatus for drying low-rank coals containing interstitial water, comprising:

a sealed vessel containing means for forming a plurality of successive fluidized beds of solids therein, having means for passing low-rank coal solids thereto at one end and means for removing said low-rank coal solids therefrom at the other end after passage therethrough;

heat exchange tubes extending into said sealed vessel at the location of each of said fluidized beds;

steam injector means at said other end of the sealed vessel for charging steam into said vessel for passage therethrough countercurrent to the flow of low-rank coal solids to fluidize the same in each of said plurality of successive fluidized beds, and remove water therefrom to form a composite steam flow;

means for exhausting said composite steam flow from said one end of the sealed vessel;

means for spraying water into said composite steam flow after exhaustion from the sealed vessel to remove solids and volatile materials therein, comprising a horizontally extending vessel having a plurality of water sprayers, a reservoir for collecting sprayed water and solids, means for filtering water collecting in the reservoir to remove solids therefrom, and means for recycling said water, after filtering, to said plurality of water sprayers;

means for heating a first portion of said steam flow, after removal of said solids and volatiles therefrom, and returning said heated first portion to the sealed vessel through said steam injector means;

means for heating a second portion of said steam flow, after removal of said solids and volatiles therefrom, and passing said heated second portion through said heat exchange tubes in the sealed vessel to effect heat exchange between said second portion of steam and said low-rank coal;

means for discharging said second portion of steam, after passage through the heat exchange tubes; and means for passing said second portion of steam from the heat exchange tubes to said means for discharging the same.

2. The apparatus as defined in claim 1 wherein means for separating a major portion of solids from said composite steam flow is provided between said means for exhausting and said means for spraying water into said composite steam flow.

3. The apparatus as defined in claim 1 including means for filtering said first portion of said steam flow, after removal of solids and volatiles therefrom, prior to said means for heating.

4. The apparatus as defined in claim 3 wherein said means for heating said first portion of said steam flow comprises first and second heat exchange units.

5. The apparatus as defined in claim 4 wherein said means for heating said second portion of said steam flow, after removal of solids and volatiles therefrom, comprises a multi-stage compressor.

6. The apparatus as defined in claim 5 wherein means is provided to pass compressed steam from a first compression stage of said multi-stage compressor to said first heat exchange unit for heat exchange with said first portion of steam to heat the same.

7. The apparatus as defined in claim 6 wherein means are provided to pass compressed steam from a latter compression stage of said multi-stage compressor to said second heat exchange unit for heat exchange with said first portion of steam to heat the same.

8. The apparatus as defined in claim 1 wherein a heating jacket is provided about said means for passing low-rank coal to said vessel and means provided for carrying said second portion of steam, after passage through said heat exchange tubes, to said heating jacket to heat said low-rank coal.

9. A method for drying low-rank coal containing interstitial water comprising:

charging low-rank coal to one end of a sealed vessel for passage therethrough;

injecting superheated steam into the other end of the sealed vessel to flow countercurrent to the passage of the low-rank coal;

fluidizing said low-rank coal within the sealed vessel by means of the injected steam in a plurality of fluidized beds;

heating the fluidizing low-rank coal within the fluidized beds in the sealed vessel to remove water therefrom and form a composite steam flow;

discharging low-rank coal, with water removed therefrom, from said sealed vessel;

exhausting the composite steam flow from said sealed vessel;

spraying water into the composite steam flow after exhaustion thereof from the sealed vessel to remove solids and volatiles therefrom, said spraying of water into the composite steam being effected in a horizontally extending vessel, said sprayed water and solids therein are collected, solids are removed and water is recycled for further spraying;

heating a first portion of said steam flow, after said spraying, and returning the same for injecting into the other end of said sealed vessel;

heating a second portion of said steam flow, after said spraying, and returning the same for heating the fluidized coal within the fluidized beds in the sealed vessel; and discharging said second portion of steam flow after heating of the fluidized beds.

10. The method as defined in claim 9 wherein the second portion of steam, discharged after heating of the fluidized beds, is in an amount substantially equal to the water removed from said low-rank coal in the sealed vessel.

11. The method as defined in claim 10 wherein, after heating of the fluidized beds and prior to discharge, said second portion of steam is used to heat low-rank coal prior to charging thereof to the sealed vessel.

12. The method as defined in claim 10 wherein said sealed vessel is vertically disposed, with said plurality of fluidized beds superimposed above each other, with low-rank coal charged to the upper region of the sealed vessel and removed from the lower region thereof.

13. The method as defined in claim 10 wherein the second portion of said steam flow is heated by compressing the same and said heated, compressed second portion is used to heat said first portion.

* * * * *